United States Patent [19]

Guéret

[11] 3,916,391

[45] Oct. 28, 1975

[54] JOSEPHSON JUNCTION MEMORY USING VORTEX MODES

[75] Inventor: Pierre L. Guéret, Thalwil, Switzerland

[73] Assignee: International Business Machines Corporation, Armonk, N.Y.

[22] Filed: Sept. 12, 1974

[21] Appl. No.: 505,433

[30] Foreign Application Priority Data

Sept. 20, 1973 Switzerland ........................ 13521/73

[52] U.S. Cl. ............ 340/173.1; 307/212; 307/238; 307/306

[51] Int. Cl.² ........................................ G11C 11/44

[58] Field of Search ......... 340/173.1; 307/212, 306, 307/245, 238

[56] References Cited

OTHER PUBLICATIONS

McCumber, Tunneling and Weak-Link Superconductor Phenomena Having Potential Device Applications, Journal of Applied Physics, Vol. 39, No. 6, 5/68, 340/173. pp. 2503-2508.

Jutzi, Memory Cell with Josephson Junctions, IBM Technical Disclosure Bulletin, Vol. 15, No. 12, 5/73, pp. 3900-3901.

*Primary Examiner*—Stuart N. Hecker
*Attorney, Agent, or Firm*—Thomas J. Kilgannon, Jr.

[57] ABSTRACT

A memory array consists of Josephson junctions arranged in rows and columns of a matrix, each individual junction serving as a storage cell for one bit of information. The junction parameters are chosen such that the junctions, while remaining in their superconducting state can assume either of at least two vortex modes wherein no flux quanta or a certain number of flux quanta can be trapped within the junction. Optimum positioning of the vortex modes is achieved by appropriately shaping the junctions which has the effect of increasing the area(s) of overlap of the vortex modes.

Switching between vortex modes for writing and reading of information is achieved by coincidentally applying word and bit currents to the columns and rows of the array, respectively. Switching between vortex modes generates voltage spikes which are detected by reading arrangements which are also disclosed.

19 Claims, 13 Drawing Figures

JOSEPHSON JUNCTION MEMORY USING VORTEX MODES

BACKGROUND OF THE INVENTION

1. Field of the Invention

This invention relates to a Josephson junction memory, i.e., a memory for storing digital information, which operates in a superconducting environment, and which makes use of the effects associated with Josephson tunneling. Such a memory may find application in the field of electronic computers.

The fact that the memory operates in a superconducting environment does not necessarily mean that cryogenic temperatures are involved. In fact, the temperature range in which the memory according to the present invention can operate strictly depends on the materials used as superconductors.

2. Description of the Prior Art

Josephson junction memories so far proposed are of the type in which one or more Josephson junctions are connected in a superconducting loop and in which, under certain conditions, a supercurrent can be trapped. The Josephson junction or junctions may be thought of as a kind of a current switch. In fact, in the known memories, the junctions are switched between their superconducting and voltage states during the writing process. Typical examples for this kind of Josephson junction memory are described in U.S. Pat. No. 3,626,391 and Swiss Pat. No. 539,919.

SUMMARY OF THE INVENTION

The present invention relates to a Josephson junction memory comprising a plurality of memory cells each consisting of a single Josephson junction, said memory being characterized in that the parameters of each individual Josephson junction are chosen such that the junction has a gain characteristic with at least two vortex modes partly overlapping each other, and whereby, in one of the vortex modes, at least one single flux quantum can be trapped within the junction, whereas in any other of the vortex modes a different number of flux quanta can be trapped, the overlapping vortex modes respectively being associated with digital values, and that each junction is coupled respectively to a word line and a bit line, to which lines currents are applied in accordance with the coincident current principle so as to switch the junction between any overlapping vortex modes for writing and reading of information.

Memories of the storage loop type, while having potential for relatively high speed, are rather large and accordingly do not seem to fit the trend in modern memory architecture which is going towards very large mass storage. Also, most of the known memories need a set-up cycle which is a major problem in some cases.

Accordingly, one object of the present invention is to provide a Josephson junction memory cell which does not require a superconducting loop for storage.

Another object is to provide a memory which does not require a set-up cycle.

Still another object is to provide a memory which is particularly suited for mass storage applications by permitting a very high packing density. This is achieved both by using single Josephson junctions for storage and by transferring the read-out circuitry outside of the memory array which, as a result, contains only Josephson junctions, and which is, therefore, simpler and cheaper than prior art memories.

A further object is to provide a memory with very low power dissipation and also very high speed.

A still further object is to provide a memory which permits reasonable manufacturing tolerances owing to a technology-compatible compensation scheme.

The foregoing and other objects, features and advantages of the invention will be apparent from the following more particular description of a preferred embodiment of the invention, as illustrated in the accompanying drawings.

DESCRIPTION OF A PREFERRED EMBODIMENT

Figure 1:
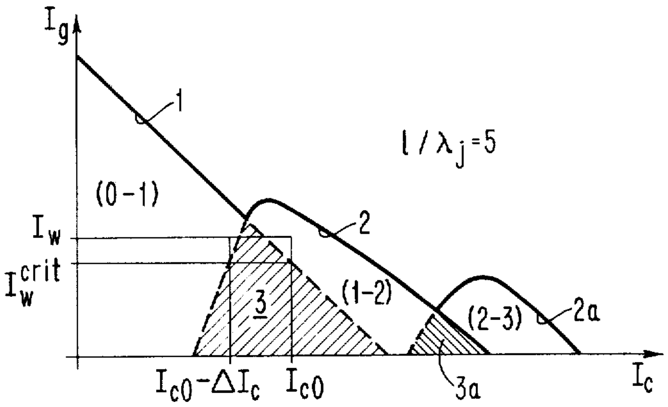
FIG. 1 shows the gain characteristic of a long Josephson junction, with overlapping vortex modes, FIGS. *2a* and *2b* are schematic diagrams of two possible embodiments of a memory array, incorporating shaped junction storage devices.

A Josephson junction with a length $l$ which is five times the Josephson penetration depth $\lambda_J$ has a gain characteristic like the one shown in FIG. 1. The solidly drawn envelope marks the boundary between the superconducting and voltage states of such a junction.

For the purposes of the present invention, the junction is operated in such a way that it always remains in its superconductive state, i.e., its operating points always stay below the solid line in FIG. 1.

In the area underneath the straight line 1 in FIG. 1, a junction is in its (0-1) vortex mode, whereas underneath the curved line 2, a junction is in its (1-2) vortex mode. In the cross-hatched area 3, a junction obviously can be in either of the two modes. In fact, it depends on the junction history in which particular mode the junction actually will be when its operating point falls within area 3.

The curved line 2a encloses a vortex mode (2-3) of the next higher order. This mode partly overlays with vortex mode (1-2) at a cross-hatched area 3a. The parameters of the Josephson junction may be chosen such that vortex mode (2-3) commences at a lower value of current $I_c$ so that a region exists where all three modes (0-1), (1-2) and (2-3) overlap each other. In that region, the junction would have three options of staying in a particular vortex mode.

The (1-2) vortex mode corresponds to that state of a junction in which a single flux quantum, $\phi_o$, is trapped within it, while in the (0-1) vortex mode, no such flux quantum is trapped. Trapping a flux quantum within a junction means that a circulating supercurrent has been induced within the latter. This current flows alongside one of the electrodes and returns alongside the other in a loop which closes through the junction oxide. This loop encloses a bunch of flux lines which add up to essentially one flux quantum, $\phi_o$. The ability of a junction to trap a flux quantum depends on its inductance which in turn is a function of its size, in that the inductance, L, is proportional to the ratio between the junction length, $l$, and its width, $w$. If the junction inductance is large enough, it is even possible that region 3 of overlap contains the origin ($I_g = I_c = O$) of the diagram of FIG. 1, allowing, therefore, single flux quantum storage without bias currents.

The reason why a large inductance allows for single flux quantum storage without external bias is to be found in the principle of flux quantization in superconductive loops. The flux content, $\phi$, of a Josephson junction is of the order of $$\phi = L\ I_m = N\ \phi_o$$

wherein $I_m$ is the maximum supercurrent, L is the junction inductance, and $N\phi_o$ is the number of flux quanta in the junction.

Accordingly, for storage of one flux quantum $\phi_o$, N = 1, and one must have:

$$L = L_1 \approx \phi_o/I_m$$

If the junction inductance, L, is smaller than $L_1$, the junction is not able to hold one flux quantum without external bias. If $L > L_1$, the junction is able to hold one or more flux quata.

The present invention takes advantage of these properties of Josephson junctions in using them in the design of a memory wherein each memory cell consists of a single Josephson junction. To this end, the (0-1) vortex mode where no flux quantum is trapped within the junction is, e.g., arbitrarily associated with the (1) binary value, whereas the (1-2) vortex mode corresponding to one trapped flux quantum is associated with the (0) binary value. If more than two vortex modes overlap each other each mode could be assigned to a ternary value, a quaternary value, and so forth. Thus, the invention proposes a Josephson memory where the individual Josephson junctions are maintained in their superconducting states with the information storage being accomplished through the switching of the junctions into one or any other of their vortex modes. To facilitate understanding, the embodiment of the invention herein described makes use only of the first two vortex modes.

It has already been mentioned that the actual mode of the junction when operated within the hatched area 3 of FIG. 1 depends on history. For example, if one first applies a control current $I_{co}$ (FIG. 1), the junction is in the (0-1) mode. By subsequently applying a bias current $I_w$ which exceeds the critical value, $I_w^{crit}$, (where the (0-1) mode becomes unstable), the junction switches rapidly from the (0-1) mode to the (1-2) mode.

When $I_w$ is now removed, no switching back occurs, the junction rather remains in the (1-2) mode. If then $I_{co}$ is reduced to $I_{co}$ - $\Delta I_c$ and a current $I_w > I_w^{crit}$ is again applied, the (1-2) mode becomes unstable, and the junction switches back to the (0-1) mode. Subsequent removal of $I_w$ and $\Delta I_c$ leaves the junction in the (0-1) mode.

Owing to the fact that each transition of a junction between its two vortex modes entails a change of its energy content, reading of the information which was stored is possible. In view of the fact that the flux change involves only a single flux quantum of $2 \cdot 10^{-15}$ Vs, the obtainable energy change is of the order of $10^{-18}$ joules for currents in the milliamperes range.

The switching between modes is extremely fast and manifests itself as a very short voltage spike of an amplitude sufficient to be discernible from the background noise.

With the Josephson junction being able to store binary information in the form of vortex modes, it is possible to design a memory array with packing densities larger than 15–30.000 cells/mm². This high figure takes into account that the read-out problem can be transferred outside the memory itself.

Figure 2A:
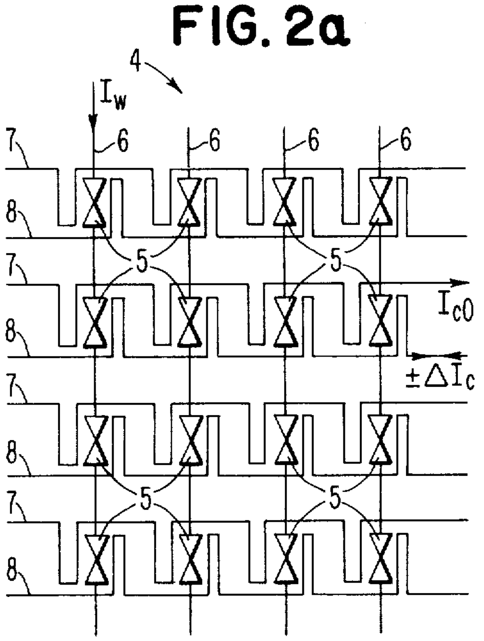

The organization of such a memory array 4 is shown in FIG. 2. The individual Josephson junctions are arranged in a matrix and all junctions 5 in a column thereof are connected in series to a word line 6. Bias lines 7 are arranged over all junctions in each row to carry a fixed control current $I_{co}$ common to all junctions. In FIG. 2*a* bit lines 8 are also guided over all junctions in each row, they carry the bipolar bit pulses $\pm \Delta I_c$.

Figure 2B:
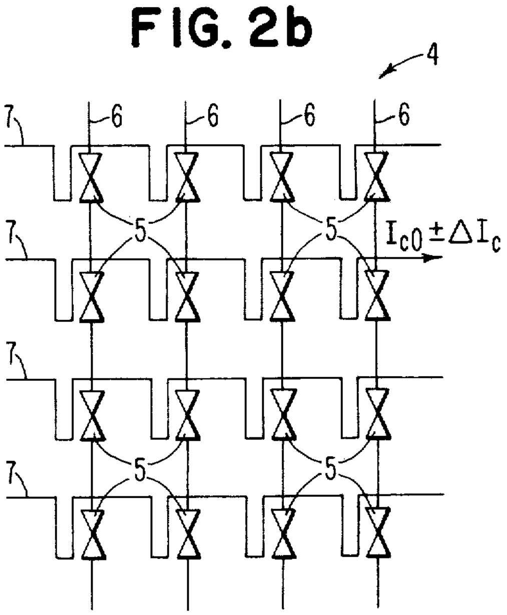

In FIG. 2*b* the bit pulses $\pm \Delta I_c$ are superposed on the fixed current $I_{co}$ on line 7.

The word current, $I_w$, and the bit current, $\Delta I_c$, are chosen such that none of them alone can cause the operating point of the junction addressed to move outside of the cross-hatched area 3 of FIG. 1. Otherwise information could be lost. In coincident operation, however, the operating point should leave the cross-hatched area, as will now be described.

Figure 3:
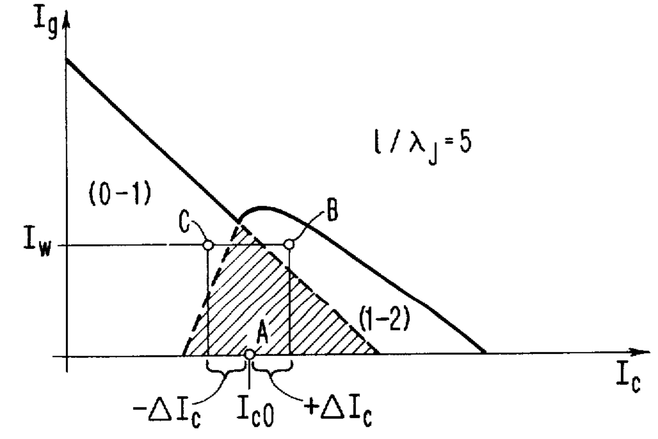
FIG. 3 shows possible operating points for the first two vortex modes of a Josephson junction.

Shifting of the operating point outside area 3 in FIG. 1 is required for certain reading and writing operations. Referring to FIG. 3, when the junction is first assumed to be in its (0-1) vortex mode corresponding to a binary (1), it occupies operating point A when a fixed control current $I_{co}$ is applied.

A bit pulse $+ \Delta I_c$ and a word current pulse $I_w$ are then simultaneously applied to the junction so that the junction operating point moves from A to B, and the junction thus switches from the (0-1) vortex mode to the (1-2) vortex mode, or from binary (1) to binary (0). Removal of $I_w$ and $+ \Delta I_c$ does not have any influence, since the junction operating point returns to a position inside the cross-hatched area 3 where both vortex modes are possible. Repetition of this operation does not change the vortex mode either.

In order to write a binary (1), the word current $I_w$ and a bit current pulse $- \Delta I_c$ are applied simultaneously. This will bring the operating point from A to C. The junction will then switch into the (0-1) vortex mode if it previously was in its (1-2) mode. If it was already in the (0-1) mode, no change will occur. Removal of bit and word currents does not cause a change. Also, repeating this operation leaves the (0-1) mode unchanged.

The reading of information stored in the individual junctions 5 that make up the memory array 4 is very much alike the writing operation. A word current, $I_w$, and a bit current, $+ \Delta I_c$, are sent out simultaneously to the junction whose information content is to be read. This will cause the junction operating point to shift from A (FIG. 2) to B. In case the junction was in its (1-2) vortex mode corresponding to a binary (0), nothing will happen: the junction just stays in that mode. Accordingly, no output is obtained, and this is representative of a stored (0).

If the junction was in its (0-1) vortex mode corresponding to a stored binary (1), the application of the currents $I_w$ and $+ \Delta I_c$ causes its switching to the (1-2) vortex mode. Thus, the information previously stored and associated with the (0-1) vortex mode is destroyed. The switching of the junction generates a voltage spike $\Delta V$ such that $\Delta V \cdot \Delta t = \phi_o$, where $\Delta t$ is the pulse duration and $\phi_o$ the flux quantum.

One half of the voltage, $\Delta V$, propagates down, and the other half up word line 6 associated with the junction addressed. Appropriate sensing means have to be provided at one end of word line 6, which must be responsive to $\Delta V/2$ over the time $\Delta t$. The other end of word line 6 is preferably terminated with its characteristic impedance, $Z_o$, to avoid reflections.

Figure 4:
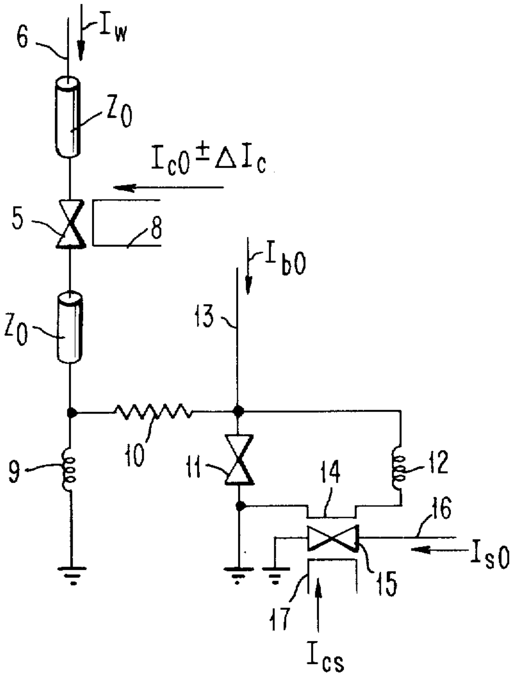
FIG. 4 is a circuit diagram for a reading scheme, utilized with memory arrays in accordance with the present invention.

FIG. 4 shows one possible scheme for reading the information from the addressed junction 5. Word line 6 is connected to junction 5 and continues to ground via an inductance 9. Word line 6 is so designed that its characteristic impedance, $Z_o$, is always maintained. Connected to the upper end of inductance 9 is a resistance 10 which is coupled to a Josephson junction 11 and to another inductance 12. Both junction 11 and inductance 12 are connected to ground.

Inductances 9 and 12 are transparent to slow signals but they effectively block the current spikes generated upon reading the information stored in junction 5. After passing resistance 10, the current spike adds to the bias current $I_{bo}$ supplied over a bias line 13 to Josephson junction 11 by a current source (not shown).

Bias current $I_{bo}$ is of a magnitude which permits junction 11 to normally remain in its superconductive state. As the read current spike is added to bias current $I_{bo}$, the maximum Josephson current of junction 11 is exceeded, and junction 11 is switched into the voltage state for a very short period of time. This will result in the transfer of at least part of bias current, $I_{bo}$, into inductance 12 and, hence, through control line 14 of a sense junction 15.

Sense junction 15 is supplied on bias line 16 with a bias current, $I_{so}$, which normally keeps junction 15 superconducting. With the increase of current in control line 14, junction 15 is switched to its voltage state. The output information can, thus, be taken from junction 15 in a conventional manner. Control line 17 on junction 15 allows choosing the operating point of that junction for best operating conditions.

It should be noted that a sensitive read scheme involves using a read junction 11 having a small maximum Josephson current, $I_m^{11}$, so that the energy content of the spike generated upon reading is comparable to the energy needed to switch read junction 11. This energy is of the order of $I_m^{11} \cdot \phi_o$.

In an example for a typical design of this reading scheme, Josephson junctions 5, 11 and 15 have a maximum current density, $J_{max} = 22\text{kA/cm}^2$. The memory junction 5 has a length $l = 5\lambda_J = 13.5\ \mu\text{m}$. The characteristic impedance of word line 6 is $Z_o = 2\ \Omega$, inductance 9 has 5 pH, inductance 12 has 20 pH. Resistance 10 has 0.1 $\Omega$. Josephson junction 11 is preferably a point junction ($l < \lambda_J$) with an area of 1.1 by 1.2 $\mu\text{m}^2$, with a maximum Josephson current $I_{mo} = 0.28$ mA. The bias current is $I_{bo} = I_{mo}$, and gives a junction current equal to 0.84 $I_{mo}$.

The short current spike generated by junction 5 upon read-out is sufficient to trigger junction 11 and produce a change of current in control line 14 of $\Delta I_{14} = 0.24$ mA. If the sense junction 15 is long, e.g., $l = 5\lambda_J$ and biased with $I_{so} = 0.8$ mA, and $I_{cs} = 0.9$ mA on control line 17, the current change $\Delta I_{14}$ suffices to cause junction 15 to switch into its voltage state.

Figure 5:
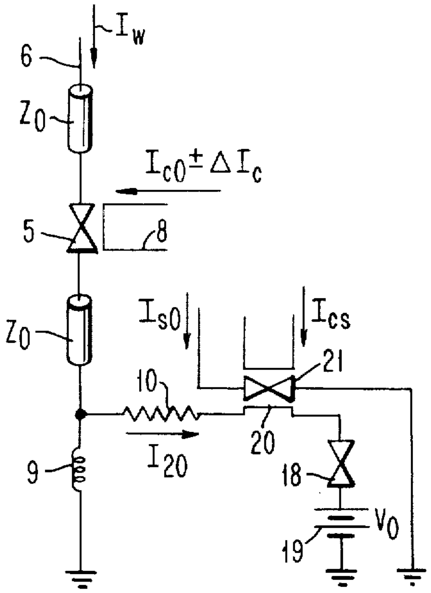
FIG. 5 is a circuit diagram for a reading scheme utilized with memory arrays in accordance with the present invention.

Another possible reading scheme is depicted in FIG. 5. As in FIG. 4, the memory junction 5 is connected to word line 6, and an inductance 9 is provided to block the reading spike from being shunted to ground. The current spike actually passes over resistance 10 to a Josephson junction 18. A bias voltage source 19 keeps junction 18 normally in its voltage state. Resistance 10 and bias voltage, $V_o$, are chosen such that the operating point of junction 18 is close to the point of spontaneous resetting, i.e., the junction voltage $V_J$ is kept close to $V_{min}$ where the junction resets into its superconducting state.

The voltage spike generated upon reading subtracts from bias voltage, $V_o$, so that the junction voltage $V_J$ becomes smaller than the resetting voltage $V_{min}$, and the junction resets to the superconducting state. As a result, the current $I_{20}$ through control line 20 increases substantially. This increase if $I_{20}$ is used to control a sense junction 21 which is normally superconducting but which is now switched to its voltage state to provide the output reading signal.

The bias voltage, $V_o$, can be provided by another Josephson junction (not shown) which is made self-resetting such that the stand-by power dissipation of the read circuit is zero.

Figure 6:
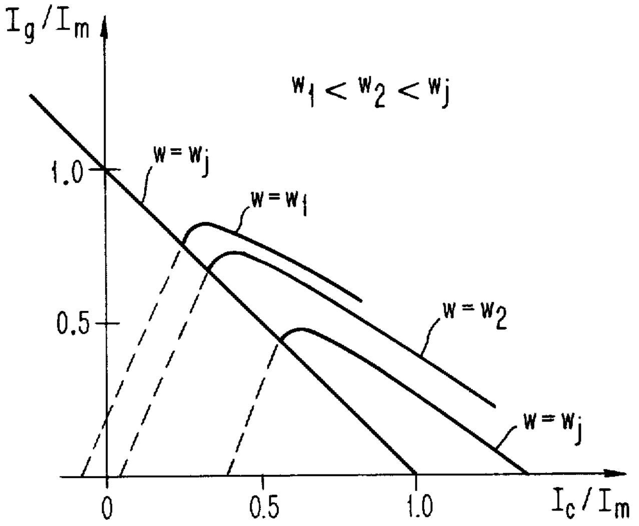
FIG. 6 shows the effect of junction shaping on the vortex modes, FIG. *7a* is an equivalent circuit of a shaped junction, FIG. *7b* is a top view of a shaped junction wherein one of the electrodes is necked down at the center, FIG. *7c* is a side view of the shaped junction of FIG. *7b*.

Referring again to FIG. 1, the position of the vortex modes and, hence, the area of overlap of the (0-1) and (1-2) vortex modes depend on the shape of the junction. In FIG. 1, the superconductors making up the junction have uniform shape. For certain applications, it is desirable to have a larger area of overlap and it is accordingly suggested that at least one of the junction electrodes be appropriately shaped. The shaping may, e.g., involve the narrowing down of the center portion of an electrode. This has a significant effect on the position of the (1-2) vortex mode as shown in FIG. 6. There is little effect on the (0-1) vortex mode, however.

Constricting the center portion of a Josephson device results in the shifting of the (1-2) vortex mode to the left in the normalized gain characteristic of FIG. 6. As the constriction, W, gets narrower ($w_1 < w_2 < w_J$), the left leg of the (1-2) vortex curve approaches the $I_g/I_m$ -axis, and finally moves beyond the origin, $I_g = I_c = 0$. When this is the case, the memory system becomes insensitive to power failures which might result in the vanishing of control current $I_c$. In other words, with the (1-2) vortex curve extending beyond the $I_g/I_m$ -axis, the region of overlap contains the $I_g = I_c = 0$ point and the information stored in the memory junctions cannot get lost upon vanishing of $I_c$.

The reason for the shifting of the (1-2) vortex mode is that the shaping of the junction alters its inductance.

Figure 7A:
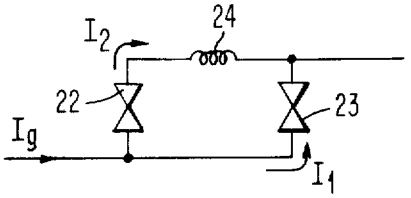
Figures 7B, 7C:
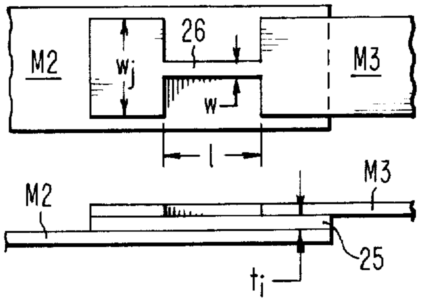

In fact, one can look at a shaped junction as a device consisting, to a first approximation, of two junctions 22 and 23 linked by an inductance 24 (FIG. 7*a*). The thickness, $t_i$, of the oxide layer 25 underneath the narrow portion 26 of the junction may either be the same as under the rest of the device — in which case the whole arrangement is a regular shaped junction — or it may be much larger than elsewhere — in which case one has a real interferometer.

The practical design of a shaped junction in accordance with the present invention is best illustrated at the calculation of a preferred embodiment. Reference is made to FIG. 7*a*. For the two junctions 22 and 23 considered, one has $I_1/I_m = \sin\phi_1$ $I_2/I_m = \sin\phi_2$ $V_{J1} = V_{J2} + L dI_2/dt,$ wherein $I_1$, $I_2$ are respectively the currents through Josephson junctions 23 and 22, $I_m$ is the maximum Josephson current, $\phi_1$, $\phi_2$ are the phase differences across the two junctions, $V_{J1}$, $V_{J2}$ are the junction voltages and L is the inductance of the constricted portion 26. Now, since $$V_J = \frac{\phi_o}{2\pi} \frac{d\phi}{dt},$$

one has $(\phi_1 - \phi_2) = \eta I_2/I_m$ $\eta = 2\pi\, L I_m/\phi_o = 2\pi N,$ where $\phi_o$ is the flux quantum and $\eta$ is the normalized inductance introduced for abbreviation. With this, the initial relations can be re-written as $I_1/I_m = \sin\phi_1$ $I_2/I_m = \sin\phi_2 = \phi_1 - \phi_2/\eta$ If, in FIG. 7*a*, $I_g = 0$, one has $I_1 + I_2 = 0$, and $\sin\phi_1 = -\sin\phi_2$. This gives the following three solutions:

a. $\phi_1 = \phi_2 = O$

This is the zero-vortex solution with stored current $I_r = 0$.

b. $\phi_1 = -\phi_2$ $$\frac{\sin\phi_2}{\phi_2} = -\frac{2}{\eta}$$

which has solutions only for $\eta > 9.24$. This is rejected if it is desired to operate in the single flux quantum mode since it leads to a mode of operation with more than one flux quantum. Accordingly, it is postulated that $\eta < 9.24$ for single flux quantum operation.

c. $\phi_1 - \phi_2 = \pm\pi$ $$\sin\phi_2 = \pm\frac{\pi}{\eta} = \pm\frac{1}{2N}$$

Since $|\sin\phi_2| < 1$, one must have $N > ½$ or $\eta > \pi$. This is the ± 1-vortex solution with stored current $I_r/I_m = \pm\pi/\eta$. With this one has the limits for $\eta$, viz.: $\pi < \eta < 9.24$, (for single flux quantum operation) and (in the absence of bias, $I_g = I_c = 0$) the stored current $I_r$:

$I_r/I_m = 0$ (zero vortex)

or $I_r/I_m = +\pi/\eta$ (+ 1-vortex)

or $I_r/I_m = -\pi/\eta$ (− 1-vortex)

Without going here into the details of derivation, one can show that $\eta$ is approximately (BCS theory)

$$\eta = 0.4\ \left(1+2\ \frac{\lambda_L/t_i}{\sqrt{1-t^4}}\right) \cdot J_{max}\, t_i \cdot \frac{l}{w} A,$$

wherein $\lambda_L$ = London penetration depth (in $\mu$m)

$t_i$ = oxide thickness underneath portion 26 (in $\mu$m)

$t = (T/T_c)$, $T_c$ = critical temperature $J_{max}$ = max. Josephson current density (in $10^4$A/cm$^2$)

$l/w$ = ratio of length/width of portion 26

A = area of each of the junctions 22 and 23 (in $\mu$m)

With $t_i = 20$ A one has a real Josephson junction which may have, e.g., a $\lambda_L = 800$ A and a $J_{max} = 10^4$A/cm$^2$. The formula for $\eta$ yields then:

$$\eta = 0.064\ l/wA$$

For the ratio $l/w = 5$ and $A = 20\ \mu m^2$, one obtains $\eta = 6.4$ within the limits imposed above.

Figure 8:
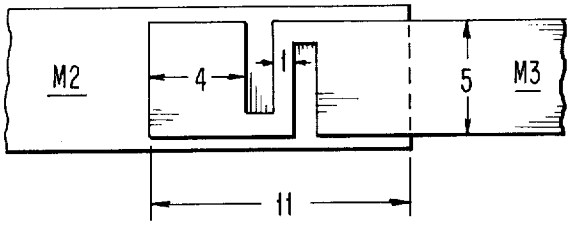
FIG. 8 is a preferred embodiment of a shaped junction, in accordance with the teaching of the present invention.

A practical layout of a structure corresponding to this example is shown in FIG. 8 (all dimensions in $\eta$m).

Figures 9, 10:
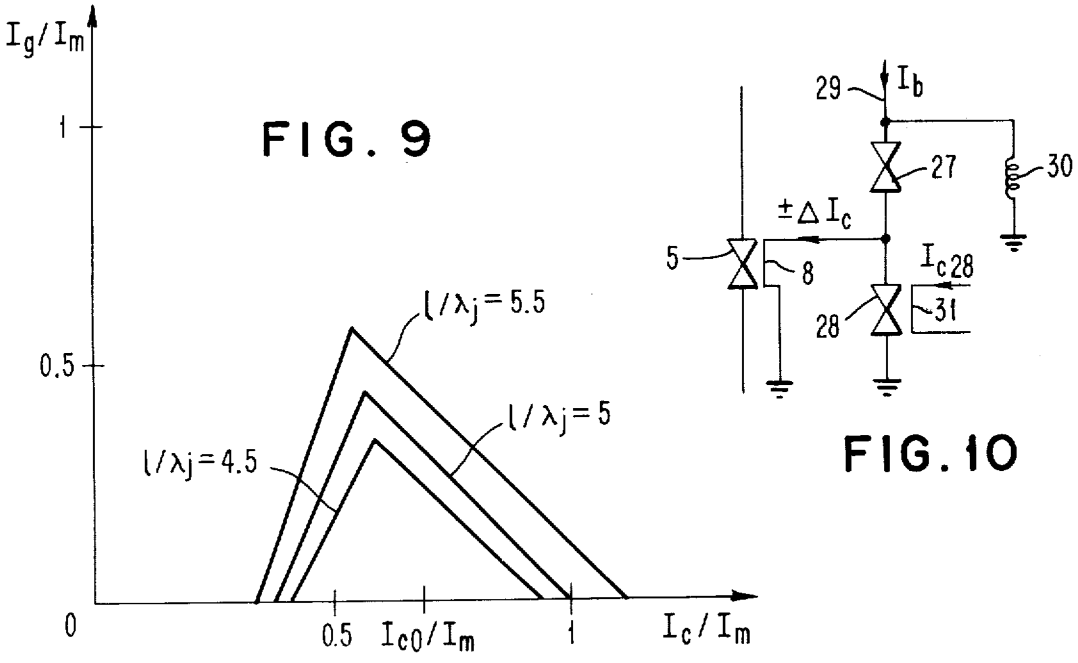
FIG. 9 shows the effect of manufacturing tolerances on the overlap (memory) region between the (0-1) and (1-2) vortex modes.
FIG. 10 is a circuit diagram for a compensation network utilized in the practice of the present invention.

The gain characteristic of a junction (FIG. 1) and consequently the overlap regions 3, 3*a* between vortex modes depend on the $l/\lambda_J$ -ratio and, therefore, on the maximum current density $J_{max}$: It is this parameter which is rather difficult to keep within tight tolerances. As $J_{max}$ varies by about ±20% around the chosen design value, the value of $l/\lambda_J$ changes from 4.5 to 5.5, the design value for $l/\lambda_J$ being 5.0. FIG. 9 shows the corresponding changes in the overlap (or memory) region 3 (0-1,1-2). In FIG. 9, $I_m$ is the maximum Josephson current for $J_{max}$ having its design value.

From this diagram, one can determine the tolerances on word and bit currents for the assumed ± 20% changes in $J_{max}$. If one assumes that the fixed control current $I_{co}$ is accurately defined, one finds, for $I_{co}/I_m =$ 0.68, $I_w/I_m = 0.12$ and $\Delta I_c/I_m = 0.27$, that the allowed variations are of the order of ± 10% for the bit current $\Delta I_c$ and ± 11% for the word current $I_w$.

These margins are possible if a certain amount of tracking is provided for the bit current $\Delta I_c$. We recall that for a properly shaped junction, $I_{co}$ can be made equal to zero which eliminates one parameter from the problem of operating margins. Note also that with the margins given above, the information content of the cells cannot be destroyed by current spikes resulting from write and read operations.

One possible scheme for tracking is shown in FIG. 10. Josephson junction 5 (FIG. 3, 4) is coupled to a bit line 8 which carries the bit current $\pm\Delta I_c$. Connected to bit line 8 is the center point of a series circuit of Josephson junctions 27 and 28 which are supplied with a bias current $I_b$ over a bias line 29. Connected in parallel to junctions 27 and 28 is an inductance 30.

If junction 28 is made larger than junction 27, and bias current $I_b$ on line 29 is chosen to exceed the maximum Josephson current $I^{27}_{max}$ of junction 27 but not the maximum Josephson current $I^{28}_{max}$ of junction 28, then junction 27 goes into its voltage state, and part of bias current $I_b$ transfers into inductance 30. When this transfer is terminated, the current remaining in junctions 27 and 28 is the minimum Josephson current $I^{27}_{min}$ which can possibly flow through junction 27 before it spontaneously returns to its superconducting state.

Control current $I_{c28}$ is then applied to a control line 31 of junction 28 to switch this junction into its voltage state and thereby transfer the current $I^{27}_{min}$ into bit line 8. As a result, bit current $\Delta I_c$ becomes equal to current $I^{27}_{min}$.

For short junctions ($l/\lambda_J < 2$), the minimum Josephson current $I_{min}$ increases approximately like $(J_{max})^2$. The scheme shown in FIG. 10 provides, therefore, a bit current $\pm \Delta I_c$ proportional to $(J_{max})^2$ which allows partial compensation of the variations in the memory cells' operating regions.

What is claimed is:

1. A Josephson junction device for storing a single flux quantum in the absence of an external magnetic field comprising:

first and second superconductive elements, an insulation layer the thickness of which is sufficient to permit Josephson tunneling along the length thereof disposed between said elements forming a single junction the gain characteristic, $I_g$ vs $I_c$, of which has a region of overlap of at least two of its vortex modes, one of said modes, the one vortex mode, representing a binary one, and another of said modes, the zero vortex mode, representing a binary zero, means integral with at least one of said elements and said layer for changing said region of overlap such that said region contains the $I_g = I_c = 0$ point of said gain characteristic wherein $I_g$ is the gate current and $I_c$ is the control current, means disposed in electrically coupled relationship with said device for storing information therein, and means disposed in electrically coupled relationship with said device for reading information stored therein.

2. A Josephson junction device according to claim 1 wherein said means for changing said region of overlap includes inductive means integral with at least one of said elements of value sufficient to change said region of overlap such that said region contains the $I_g = I_c = 0$ point of said gain characteristic.

3. A Josephson junction device according to claim 2 wherein said inductive means includes at least a portion of at least one of said elements being shaped to provide a narrower tunneling region between wider tunneling regions of said at least one of said elements.

4. A Josephson junction device according to claim 1 wherein said means for storing includes at least a single control element disposed in overlying relationship with said device and means coupled to said device and said control element for applying coincident gate and control currents, respectively, to said device and said control element.

5. A Josephson junction device according to claim 4 wherein said means for applying coincident gate and control currents includes sources connected to said devices and said control element, the current magnitudes and polarities of which, to write a binary one in the absence of a stored binary zero, are insufficient to change said device from a one vortex mode to a zero vortex mode, and, in the presence of a stored binary zero are sufficient to change said device from a zero vortex mode to a one vortex mode, and the current magnitudes and polarities of which, to write a binary zero in the absence of a stored binary zero, are sufficient to change said device from a one vortex mode to a zero vortex mode, and, in the presence of a stored binary zero are insufficient to change said device from a zero vortex mode to a one vortex mode.

6. A Josephson junction device according to claim 1 wherein said means for storing includes means electrically connected to said device for applying coincident currents thereto sufficient to switch said device between said vortex modes to store one binary condition and for maintaining said device in an unchanged state for another stored binary condition.

7. A Josephson junction device according to claim 6 wherein said means for applying coincident gate and control currents includes sources connected to said devices and said control element, the current magnitudes and polarities of which, to write a binary one in the absence of a stored binary zero, are insufficient to change said device from a one vortex mode to a zero vortex mode, and, in the presence of a stored binary zero are sufficient to change said device from a zero vortex mode to a one vortex mode, and the current magnitudes and polarities of which, to write a binary zero in the absence of a stored binary zero, are sufficient to change said device from a one vortex mode to a zero vortex mode, and, in the presence of a stored binary zero are insufficient to change said device from a zero vortex mode to a one vortex mode.

8. A Josephson junction device according to claim 1 further including means disposed in electromagnetically coupled relationship with said device for compensating for the variation in maximum current density ($J_{max}$) of said device.

9. A Josephson junction device according to claim 8 wherein said means for compensating includes first and second Josephson junctions connected in series, a control line electromagnetically coupled to said device connected between said junctions, an inductance connected in parallel with said junctions, means for supplying current to said junctions, said first and second junctions being of different sizes such that when said current is supplied, the maximum Josephson current of said first junction is surpassed and current flowing in said control line equals the minimum Josephson current of said second junction.

10. A Josephson junction device according to claim 1 wherein said means for reading includes at least a single control element disposed in overlying relationship with said device and means coupled to said device and said control element for applying coincident gate and control currents, respectively, to said device and said control element.

11. A Josephson junction device according to claim 10 wherein said means connected to said device and said control element include sources connected to said device and said control element, the current magnitudes and polarities of which, to read one binary condition, are insufficient to change the condition of said device, and, the current magnitudes and polarities to which, to read another binary condition, are sufficient to switch said device between said vortex modes.

12. A Josephson junction device according to claim 11 further including means connected to said device for sensing the switching of said device between said vortex modes.

13. A Josephson junction device according to claim 12 wherein said sensing means includes a first inductance disposed in series with said device, a first Josephson junction, means for applying a current through said first junction, a resistance disposed between said first Josephson junction and said first inductance, a second inductance connected in parallel with said first Josephson junction via a control conductor, said first junction being biased to be normally in the superconducting state and switchable to the voltage state in response to the appearance of a sense signal when said device switches between said vortex modes, and, a second Josephson junction adapted to provide an output signal in response to the diversion of current from said first junction into second inductance of said control conductor when said first Josephson junction is switched.

14. A Josephson junction device according to claim 12 wherein said sensing means includes an inductance disposed in series with said device, a first Josephson junction, a resistance disposed between said first junction and said first inductance and connected to said first junction via a control conductor, means connected to said first junction for biasing said first junction to an operating point close to spontaneous resetting such that in response to the appearance of a sense signal when said device switches between said vortex modes said first junction switches from the voltage state to the superconducting state increasing the flow of current in said control line, and, a second Josephson junction adapted to provide an output signal in response to the increased current in said control line.

15. A Josephson junction device according to claim 1 wherein said means for reading includes means connected to said device and said control element for switching between vortex modes for one stored binary condition and for maintaining said device in an unchanged state for another stored binary condition.

16. A Josephson junction device according to claim 15 wherein said means connected to said device and said control element includes sources connected to said device and said control element, the current magnitudes and polarities of which, to read one binary condition, are insufficient to change the condition of said device, and, the current magnitudes and polarities of which, to read another binary condition, are sufficient to switch said device between said vortex modes.

17. A Josephson junction device according to claim 16 further including means connected to said device for sensing the switching of said device between said vortex modes.

18. A Josephson junction device according to claim 17 wherein said sensing means includes a first inductance disposed in series with said device, a first Josephson junction, means for applying a current through said first junction, a resistance disposed between said first Josephson junction and said first inductance, a second inductance connected in parallel with said first Josephson junction via a control conductor, said first junction being biased to be normally in the superconductive state and switchable to the voltage state in response to the appearance of a sense signal when said device switches between said vortex modes, and, a second Josephson junction adapted to provide an output signal in response to the diversion of current from said first junction into second inductance and said control conductor when said first Josephson junction is switched.

19. A Josephson device according to claim 17 wherein said sensing means includes an inductance disposed in series with said device, a first Josephson junction, a resistance disposed between said first junction and said first inductance and connected to said first junction via a control conductor, means connected to said first junction for biasing said first junction to an operating point close to spontaneous resetting such that in response to the appearance of a sense signal when said device switches between said vortex modes said first junction switches from the voltage state to the superconducting state increasing the flow of current in said control line, and, a second Josephson junction adapted to provide an output signal in response to the increased current in said control line.

* * * * *